United States Patent Office 3,230,255
Patented Jan. 18, 1966

3,230,255
PREPARATION OF IMIDOYL HALIDES
Angelo John Speziale, Creve Coeur, and Lowell R. Smith, St. Louis, Mo., assignors to Monsanto Company, a corporation of Delaware
No Drawing. Filed Mar. 16, 1962, Ser. No. 180,343
11 Claims. (Cl. 260—566)

This invention relates to a new class of imidoyl halides and an unusual process for their preparation. More specifically, the invention relates to a process which induces the formation of the subject compounds from α-halogenated N-substituted amides.

In accordance with this invention it has been found that in the presence of a tertiary phosphine the following rearrangement takes place:

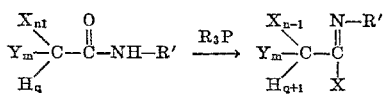

wherein $n$ is an integer from two (2) to three (3), and $m$ and $q$ are each integers from zero (0) to one (1), provided that the sum of $n$, $q$ and $m$ is always three; wherein X is an atom from the class consisting of chlorine and bromine; wherein Y is selected from the class consisting of fluorine, phenyl and alkyl radicals having up to four carbon atoms; wherein R' is an organic radical selected from the group consisting of hydrocarbon radicals of the class consisting of the aliphatic radicals of up to 12 carbon atoms, cycloaliphatic radicals of five to seven carbon atoms, phenyl and benzyl, and the said hydrocarbon radicals having substituents of the class consisting of nitro, chlorine, alkyl radicals having up to four carbon atoms and alkoxy radicals having up to four carbon atoms, provided that when Y is selected from the group consisting of hydrogen and alkyl radicals of up to four carbon atoms, R is selected from the group consisting of phenyl, benzyl and cycloaliphatic radicals of five to seven carbon atoms.

In the preparation of the new class of compounds mono N-substituted amides of the above-described structure must be used in the practice of the novel procedure. This class of amides includes 2,2,2-trichloroacetanilide,
N-2-butenyl-2,2-dichloropropionamide,
N-cyclohexyl-2,2,2-trichloroacetamide,
N-dodecyl-2,2-dichloro-2-bromoacetamide,
N-ethyl-2,2,2-tribromoacetamide,
N-allyl-2,2-dichloro-2-benzylacetamide,
N-p-chlorobenzyl-2,2-dibromoacetamide,
N-2-propoxyethyl-2,2,2-trichloroacetamide,
N-2-decynyl-2,2,2-tribromoacetamide,
2,2-dichloroacetanilide,
2,2-dichloro-2-fluoro-p-nitroacetanilide,
2,2-dichloro-p-nitroacetanilide,
2,2,2-trichloro-p-toluidide,
2,2,2-trichloro-o-toluidide,
α,α-Dichlorophenylacetanilide,
N-propyl-α,α-dichlorophenylacetamide,
N-hexyl-2,2-dichloro-2-fluoroacetamide,
N-methyl-2,2,2-trichloroacetamide,
2,2,2-trichloro-p-methoxyacetanilide,
2,2-dibromoacetanilide,
2,2-dichloro-2-fluoroacetanilide,
N-butyl-2,2-dichloro-2-fluoroacetamide, and others conforming with the above equation.

Suitable trivalent phosphorus compounds for effecting the reaction are the tertiary phosphines and the triesters of phosphorus acid. These reactants have the structure

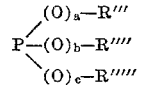

wherein each of $a$, $b$ and $c$ are integers from zero (0) to one (1) and each of R''', R'''' and R''''' is aliphatic, cycloaliphatic, phenyl, benzyl and the said substituted radicals. This class of compounds includes:

Triphenyl phosphine
Tri-n-butyl phosphite
Diethyl phenylphosphinite
Cyclohexyl diethylphosphinite
Diethylphenyl phosphine
Phenyldimethyl phosphite
Dibenzyl ethylphosphonite
Cyclopentenyl-di(n-butyl) phosphinite
Tri(2-ethyl)hexyl phosphine
Dibenzyl phenylphosphonite
Dimethylphenyl phosphine
Triethyl phosphite
Diethyl ethylphosphonite
Ethyl diphenylphosphinite
Cyclopentyldiethyl phosphine
Triisopropyl phosphite
Dihexyl phenylphosphonite
Tri(n-butyl) phosphine
Tribenzyl phosphine By the proper selection of the N-substituted halo-acetamide and a suitable phosphine or ester of a trivalent phosphorus acid, imidoyl halides of the above-described types may be synthesized; for example N-phenyl-2,2-dibromoacetimidoyl bromide
N-phenyl-2,2-dichloroacetimidoyl chloride
N-benzyl-2,2-dibromopropimidoyl bromide
N-cyclohexyl-2,2-dichloroacetimidoyl chloride
N-dodecyl-2,2-dichloroacetimidoyl bromide
N-ethyl-2,2-dibromoacetimidoyl bromide
N-cycloheptenyl-2-chloro-2-benzylacetimidoyl chloride
N-p-chlorobenzyl-2-bromoacetimidoyl bromide
N-2-propoxyethyl-2,2-dichloroacetimidoyl chloride
N-n(3-chloro)butyl-2,2-dibromoacetimidoyl bromide
N-p-nitrophenyl-2-chloro-2-fluoroacetimidoyl chloride
N-phenyl-2-chloroacetimidoyl chloride.

The reactions described above are conducted by combining the amides with the trivalent phosphorus compound at room temperature or slightly higher to initiate the reaction. Since the reactions are exothermic it is frequently desirable to combine the reagents slowly so as to maintain the reaction temperature below a predetermined maximum. It is often useful to apply cooling such as an ice bath. Since the reactions are conveniently effected in an organic liquid medium, for example ether, the cooling may be achieved by refluxing under a cold condenser. Suitable liquid diluents are benzene, toluene, hexane, ether, and light petroleum fractions. Many of the products are liquids which may be separated by fractional distillation. The heavier products, especially those with large substituents on the nitrogen atom, the solids and can be purified by recrystallizing from suitable solvent, such as methanol.

*Example 1*

A mixture of 2,2,2-trichloroacetanilide (47.7 g., 0.2 mole) and benzene (200 ml.) was stirred at room temperature while tributyl-phosphine (40.5 g., 0.2 mole) was added dropwise. The exothermic reaction was controlled by adding the tributyl-phosphine at such a rate that the temperature was kept below 40°. The solution was stirred for 2 hours after the completion of the addition and then heated at 50° for 0.5 hr. The benzene was removed in vacuo and distillation produced a yellow liquid which on redistillation gave colorless N - phenyl - 2,2 - dichloroacetimidoyl chloride (14.6 g., 0.065 mole, 33%), B.P. 83–86° (0.5 mm.), $n_D^{25}$ 1.5665.

*Example II*

A solution of triphenylphosphine (52.4 g., 0.2 mole) in hexane (200 ml.) was heated to 60° and N-ethyl-2,2,2,-trichloroacetamide (38.1 g., 0.2 mole) was added in small portions. The solution was refluxed for one hour and then the hexane was removed in vacuo. Distillation produced N-ethyl-2,2,-dichloroacetimidoyl chloride as a colorless liquid (16.1 g., 0.092 mole, 46%), B.P. 72° (3 mm.), $n_D^{25}$ 1.4792.

*Example III*

A mixture of 2,2-dichloracetanilide (10.2 g., 0.050 mole) and tributylphosphine (10.1 g., 0.050 mole) was heated and stirred in a nitrogen atmosphere. At 70° an exothermic reaction increased the temperature to 130°. The reaction was moderated with an ice-bath and after the temperature had dropped to 50° the solution was heated at 80–90° for 0.5 hr. Distillation produced a yellow oil, B.P. 140–144° (10 mm.), which on redistillation gave N-phenyl-2-chloroacetimidoyl chloride (3.3 g., 0.018 mole, 36%), B.P. 73–75° (0.45 mm.), $n_D^{23}$ 1.5677.

Although the invention is described above with respect to specific modifications, it is not intended that the details thereof should be limitations on the scope of the invention, except to the extent incorporated in the following claims.

What is claimed is:

1. The method of preparing compounds of the structure

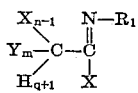

wherein *n* is an integer from two to three and *m* and *q* are integers from zero to one, provided that the sum of *n*, *q* and *m* is always three; wherein X is a halogen selected from the class consisting of bromine and chlorine; wherein the Y substituent is selected from the class consisting of the fluorine atom, the phenyl radical and the alkyl radicals having up to four carbon atoms; and wherein R' is an organic radical selected from the class consisting of hydrocarbon radicals of the class consisting of alkyl radicals of up to 12 carbon atoms, cycloalkyl radicals of five to seven carbon atoms, the phenyl radical and the benzyl radical; and the said hydrocarbon radicals having substituents selected from the groups consisting of nitro, chlorine, alkyl radicals of up to four carbon atoms, and alkoxy radicals of up to four carbon atoms, provided that when *n* is 2 the other substituent is selected from the group consisting of hydrogen, fluorine or alkyl having up to four carbon atoms, which comprises contacting the compound

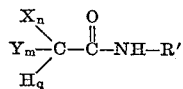

with a compound of the structure

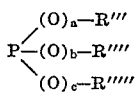

wherein *a*, *b* and *c* are each integers from zero to one; and wherein each of the radicals R''', R'''' and R''''' are selected from the group consisting of hydrocarbon radicals of the class consisting of alkyl radicals of up to 12 carbon atoms, cycloalkyl radicals of five to seven carbon atoms, phenyl and benzyl.

2. The method of preparing a compound of the structure

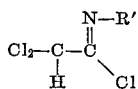

wherein R' is an alkyl hydrocarbon radical of up to 12 carbon atoms, which comprises heating the compound

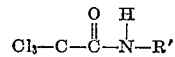

in the presence of a trialkyl phosphine wherein the alkyl moiety has up to 12 carbon atoms.

3. The method of preparing a compound of the structure

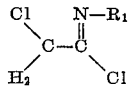

wherein R' is phenyl, which comprises heating a compound of the structure

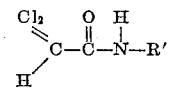

in the presence of a trialkyl phosphine wherein the alkyl moiety has up to 12 carbon atoms.

4. The method of preparing a compound of the structure

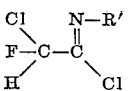

where R' is a cycloalkyl radical of 5 to 7 carbon atoms, which comprises heating a compound of the structure

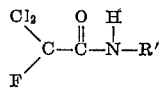

in the presence of a trialkyl phosphine wherein the alkyl moiety has up to 12 carbon atoms.

5. The method of preparing a compound of the structure

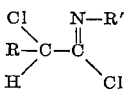

ture wherein R is an alkyl radical of up to four carbon atoms and wherein R' is an alkyl of up to 12 carbon atoms, which comprises heating the compound of the structure

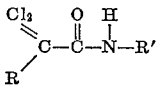

in the presence of a trialkyl phosphine wherein the alkyl moiety has up to 12 carbon atoms.

6. The method of preparing a compound of the structure

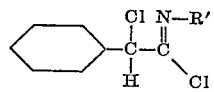

wherein R' is an alkyl of up to 12 carbon atoms, which comprises heating the compound of the structure

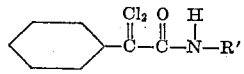

in the presence of a trialkyl phosphine wherein the alkyl moiety has up to 12 carbon atoms.

7. The method of preparing N-ethyl-2,2-dichloroacetimidoyl chloride which comprises heating N-ethyl-2,2,2-trichloroacetamide in the presence of tributyl phosphine.

8. The method of preparing N-phenyl-2-chloroacetimidoyl chloride which comprises heating N-phenyl-2,2-dichloroacetamide in the presence of triphenyl phosphine.

9. The method of preparing N-phenyl-2-chloro-2-fluoroacetimidoyl chloride which comprises heating N-phenyl-2,2-dichloro-2-fluoroacetamide in the presence of tributyl phosphine.

10. The method of preparing N-phenyl-2-chloropropionimidoyl chloride which comprises heating N-phenyl-2,2-dichloropropionamide in the presence of triphenyl phosphine.

11. The method of preparing N-ethyl-α,β-dichlorostyrylimidoyl chloride with comprises heating N-ethyl-2-chloro-2-phenylacetamide in the presence of tributyl phosphine.

References Cited by the Examiner

Braun et al.: Ber. Deut. Chem., vol. 55, pp. 3165–3170 (1922).

Kreutzkamp et al.: Naturwissenschaften, vol. 42, p. 415 (1955).

CHARLES B. PARKER, *Primary Examiner.*

LEON ZITVER, *Examiner.*